(12) United States Patent
Im et al.

(10) Patent No.: US 6,676,201 B2
(45) Date of Patent: Jan. 13, 2004

(54) WEDGE SYSTEM FOR LIFTGATE OF VEHICLE

(75) Inventors: Kee Hyuk Im, Rochester Hills, MI (US); Ravikumar Parthasarathy, Rochester Hills, MI (US); Peter R. Scholar, Ortonville, MI (US); Scott W. Thorpe, Milford, MI (US); Paul L Yetter, Washington Township, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/091,334

(22) Filed: Mar. 5, 2002

(65) Prior Publication Data

US 2003/0168883 A1 Sep. 11, 2003

(51) Int. Cl.$^7$ .............................. B60J 10/08; B60J 5/10
(52) U.S. Cl. ...................... 296/207; 16/82; 296/146.8; 296/146.9
(58) Field of Search .................. 296/146.1, 146.5, 296/146.8, 146.9, 187, 207; 16/82, 86 A, 86 B, 86 R

(56) References Cited

U.S. PATENT DOCUMENTS

| | | | |
|---|---|---|---|
| 3,944,278 A | * | 3/1976 | Takahashi et al. ....... 296/146.6 |
| 5,421,124 A | * | 6/1995 | Zuccaro ....................... 49/381 |
| 5,549,351 A | * | 8/1996 | Park ........................... 296/207 |
| 5,584,528 A | * | 12/1996 | Cozzani ...................... 296/207 |
| 5,791,723 A | * | 8/1998 | Bell et al. ................... 296/155 |
| 5,806,917 A | * | 9/1998 | Townsend ................... 296/202 |
| 6,039,389 A | * | 3/2000 | Monette et al. ............. 296/207 |

FOREIGN PATENT DOCUMENTS

| | | | | |
|---|---|---|---|---|
| DE | 3304569 C1 | * | 7/1984 | ............. 296/146.3 |
| EP | 556419 A1 | * | 8/1993 | ............. 296/146.9 |
| JP | 62053266 A | * | 3/1987 | .................. 296/93 |

* cited by examiner

Primary Examiner—Stephen T. Gordon
Assistant Examiner—Paul Chenevert
(74) Attorney, Agent, or Firm—Laura C. Hargitt

(57) ABSTRACT

A wedge system for stabilizing a liftgate of a vehicle relative to vehicle structure of the vehicle includes a first member for mounting on one of the liftgate and the vehicle structure. The wedge system also includes a second member for mounting on the other of the liftgate and the vehicle structure. The wedge system further includes a third member disposed between the first member and the second member and being movable and adjustable relative thereto to accommodate a gap between the liftgate and the vehicle structure and to stabilize the liftgate by providing a load path from the liftgate to the vehicle structure when the liftgate is in a closed position.

5 Claims, 2 Drawing Sheets

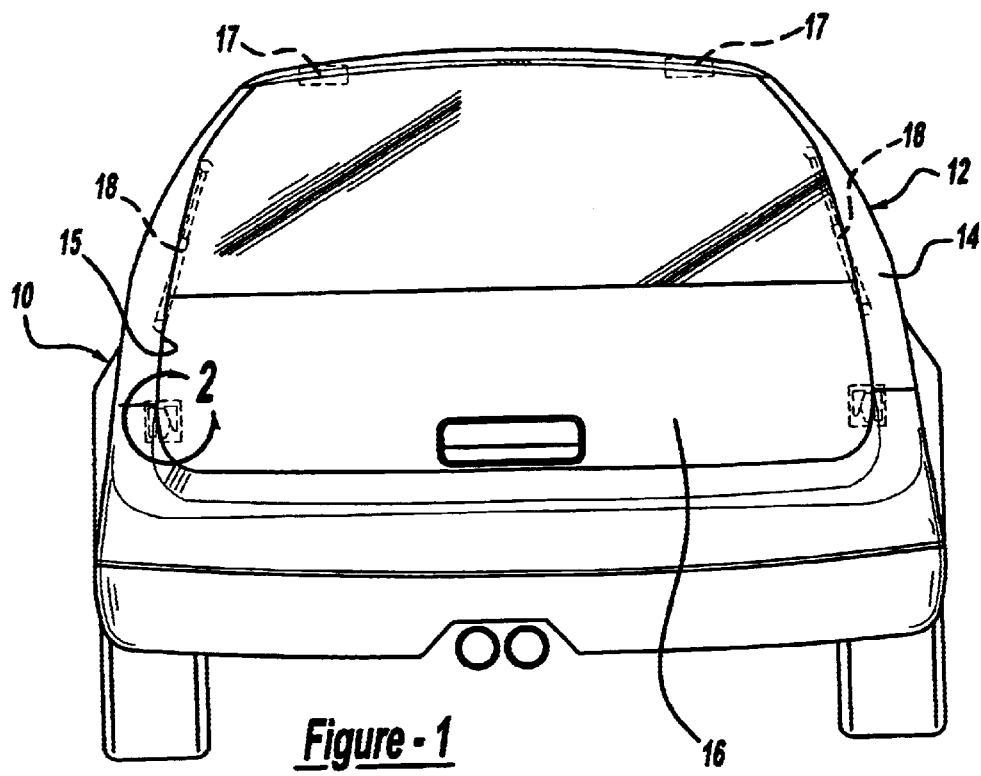
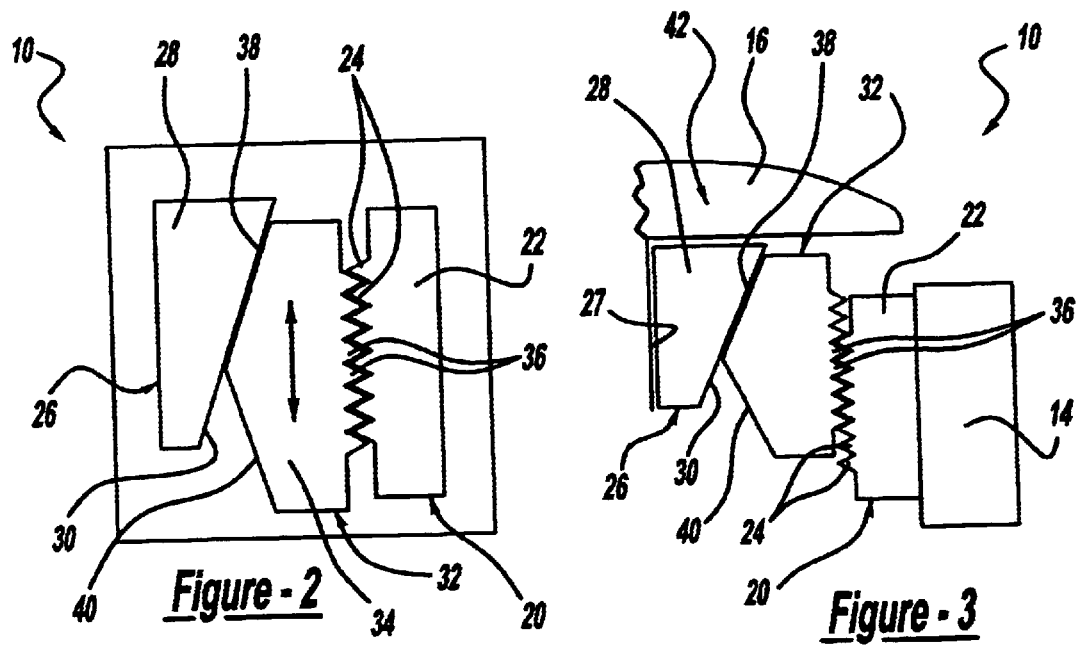

WEDGE SYSTEM FOR LIFTGATE OF VEHICLE

TECHNICAL FIELD

The present invention relates generally to closures such as liftgates for vehicles and, more particularly, to a wedge system for a liftgate of a vehicle.

BACKGROUND OF THE INVENTION

It is known to provide vehicles such as sports utility vehicles or minivans with a closure such as a liftgate attached to a longitudinal end of the vehicle for access to an occupant compartment of the vehicle. The liftgate is typically hinged to vehicle structure such as a vehicle body of the vehicle with at least one, preferably a pair of laterally spaced hinges to allow pivotal movement of the liftgate. The liftgate typically includes a latching mechanism to secure the liftgate to the vehicle body when closed.

The liftgate has multiple functional requirements such as structural integrity, optimal closing and opening efforts, sealing, etc. These requirements are dependent on geometry of the liftgate, material properties, and hardware such as gas struts and wedges. Among the hardware used in the liftgate is a wedge. The wedge is a relatively small piece of elastomer, metal, or plastic attached to the side of the liftgate.

The wedge has to meet three requirements. One of these requirements is stabilization of the liftgate, especially in preventing the liftgate from traveling cross-vehicle, fore/aft, and vertically during various vehicle body twist frequency sweeps of the vehicle, by providing a load path from the liftgate to a frame of the vehicle body. Another requirement is to minimize the closing effort increase of the liftgate due to the reaction force in the swing-line direction. Yet another requirement is to accommodate the gap and flushness variation between the liftgate and vehicle body due to manufacturing and assembly.

One attempt at meeting the above requirements is to use a rubber block type wedge. In these vehicles, a rubber block is located in the gap between the liftgate and the vehicle body. However, this type of wedge significantly increases the closing effort of the liftgate and is hard to adjust to accommodate the gap variation.

Another attempt at stabilizing the liftgate is to use a spring loaded plastic bumper on each side of the liftgate, which would, in turn, mate with rubber stop pads. However, these bumpers and pads only provide cross-vehicle stabilization to prevent the liftgate from being excited beyond its own natural frequency into a state of impending motion. These bumpers and pads also require overslam bumpers to control movement in the fore/aft and up/down directions of the vehicle.

Therefore, it is desirable to provide a wedge system for a liftgate of a vehicle that stabilizes the liftgate. It is also desirable to provide a wedge system for a liftgate of a vehicle that is adjustable to accommodate the gap and flushness variation between the liftgate and the vehicle body. It is further desirable to provide a wedge system for a liftgate of a vehicle that minimizes the closing effort increase of the liftgate due to the reaction force in the swing-line direction. Therefore, there is a need in the art to provide a wedge system for a liftgate of a vehicle that meets these desires.

SUMMARY OF THE INVENTION

It is, therefore, one object of the present invention to provide a wedge system for stabilizing a liftgate of a vehicle. It is another object of the present invention to provide a wedge system for stabilizing a liftgate of a vehicle to reduce cross-vehicle, fore/aft, and vertical movement of the liftgate.

It is yet another object of the present invention to provide a wedge system for stabilizing a liftgate of a vehicle that is able to fit into tight packaging areas.

To achieve the foregoing objects, the present invention is a wedge system for stabilizing a liftgate of a vehicle relative to vehicle structure of the vehicle when in a closed position. The wedge system includes a first member for mounting on one of the liftgate and the vehicle structure and a second member for mounting on the other of the liftgate and the vehicle structure. The wedge system includes a third member disposed between the first member and the second member and being movable and adjustable relative thereto to accommodate a gap between the liftgate and the vehicle structure and to stabilize the liftgate by providing a load path from the liftgate to the vehicle structure when the liftgate is in a closed position.

One advantage of the present invention is that a wedge system is provided for stabilizing a liftgate of a vehicle. Another advantage of the present invention is that the wedge system is adjustable and uses a finger tight ratchet to accommodate gap variation for a liftgate of the vehicle. Another advantage of the present invention is that the wedge system minimizes squeak and rattle noise due to the vibration of the liftgate while the closing effort is not increased regardless of the gap variation. Another advantage of the present invention is that the wedge system has an adjustment time that is almost negligible to the assembly line speed. Yet another advantage of the present invention is that the wedge system is able to fit into tight packaging areas of the vehicle. Still another advantage of the present invention is that the wedge system reduces cross-vehicle movement of the liftgate. A further advantage of the present invention is that the wedge system reduces fore/aft liftgate chucking of a latch/striker combination for the liftgate. Yet a further advantage of the present invention is that the wedge system reduces vertical displacement of the liftgate. Still a further advantage of the present invention is that the wedge system is an effective integrated three-piece system without the aid of mechanical parts. Another advantage of the present invention is that the wedge system increases the stability of the liftgate without compromising the closing effort and accommodates build variation without slowing down the assembly line. Yet another advantage of the present invention is that the wedge system eliminates overslam bumpers and is modular to be used across a variety of vehicles.

Other objects, features, and advantages of the present invention will be readily appreciated, as the same becomes better understood, after reading the subsequent description taken in conjunction with the accompanying drawings.

BRIEF DESCRIPTION OF THE DRAWINGS

FIG. 1 is an elevational view of a wedge system, according to the present invention, illustrated in operational relationship with a liftgate of a vehicle.

FIG. 2 is an enlarged plan view of the wedge system in circle 2 of FIG. 1.

FIG. 3 is a plan view of the wedge system of FIG. 1 illustrated before adjustment.

DESCRIPTION OF THE PREFERRED EMBODIMENT

Figure 4:
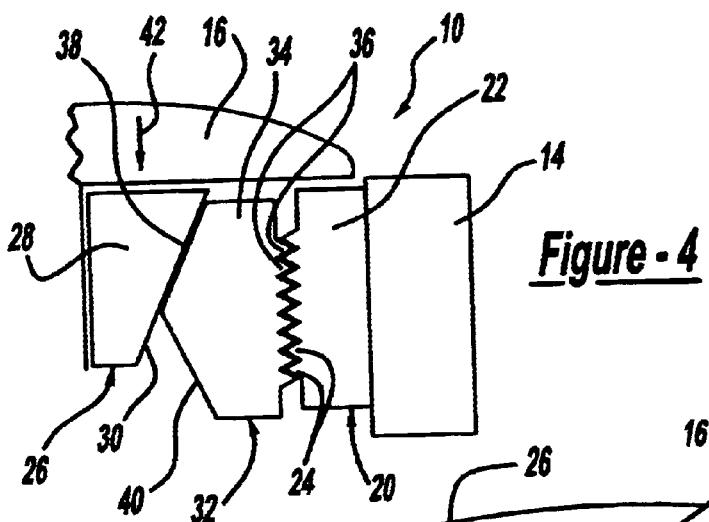
FIG. 4 is a view similar to FIG. 3 illustrating the wedge system after adjustment.

Referring to the drawings and in particular FIG. 1, a wedge system 10, according to the present invention, is illustrated in operational relationship with a vehicle, generally indicated at 12. The vehicle 12 includes vehicle structure such as a vehicle body 14 having an opening 15 at a longitudinal end thereof. The vehicle 12 also includes an openable member such as a liftgate 16 pivotally attached to the vehicle body 14 by suitable means such as laterally spaced hinges 17 to open and close the opening 15. The vehicle 12 may include a pair of gas struts 18 interconnecting the vehicle body 14 and the liftgate 16 to assist an operator in lifting the liftgate 16. The vehicle 12 further includes the wedge system 10 disposed between the liftgate 16 and vehicle body 14 on each side of the opening 15 and is used to stabilize the liftgate 16 relative to the vehicle body 14 when in a closed position. It should be appreciated that, except for the wedge system 10, the vehicle 12 is conventional and known in the art.

Referring to FIGS. 2 through 4, the wedge system 10 includes a first member, generally indicated at 20, disposed adjacent the vehicle body 14 and secured thereto by suitable means such as fasteners (not shown). The first member 20 is generally rectangular in shape and extends transversely to form a block. The first member 20 has a generally solid base portion 22 for mounting against the vehicle body 14 and a plurality of teeth 24 spaced therealong and extending toward the liftgate 16 for a function to be described. The first member 20 is made of a generally rigid material such as plastic PVC, metal (ferrous or non-ferrous), or the like, or formed into the vehicle body 14. It should be appreciated that the first member 20 is used on each lateral or transverse side of the opening 15 for the liftgate 16.

The wedge system 10 also includes a second member, generally indicated at 26, for mounting on the liftgate 16. The second member 26 is generally trapezoidal in shape and extends transversely to form a block. The second member 26 is made of a generally resilient material such as rubber, plastic, or the like. The second member 26 has a base portion 28 extending transversely for mounting against an inner panel 27 of the liftgate 16 and for being secured thereto by suitable means such as fasteners (not shown). The second member 26 also includes a tapered outer surface 30 extending outwardly at an angle from the base portion 28. The tapered outer surface 30 is generally planar in shape for a function to be described. It should be appreciated that the second member 26 is used on each lateral or transverse side of the liftgate 16.

The wedge system 10 further includes a third member, generally indicated at 32, disposed between the first member 20 and second member 26 and secured to the vehicle body 14 by suitable means such as fasteners (not shown). The third member 32 is generally pentagonal in shape and extends transversely to form a block. The third member 32 has a generally solid base portion 34 and a plurality of teeth 36 spaced therealong and mating with the teeth 24 of the first member 20 for a function to be described. The third member 32 also has a first tapered outer surface 38 extending outwardly at an angle from the base portion 34 and mating with the tapered outer surface 30 of the second member 26. The third member 32 further has a second tapered outer surface 40 extending outwardly at an angle from the base portion 34 and away from the first tapered outer surface 38. The first tapered outer surface 38 and second tapered outer surface 40 are generally planar in shape for a function to be described. The third member 32 is made of a plastic material. It should be appreciated that the third member 32 is used on each lateral or transverse side of the liftgate 16.

Figure 5:
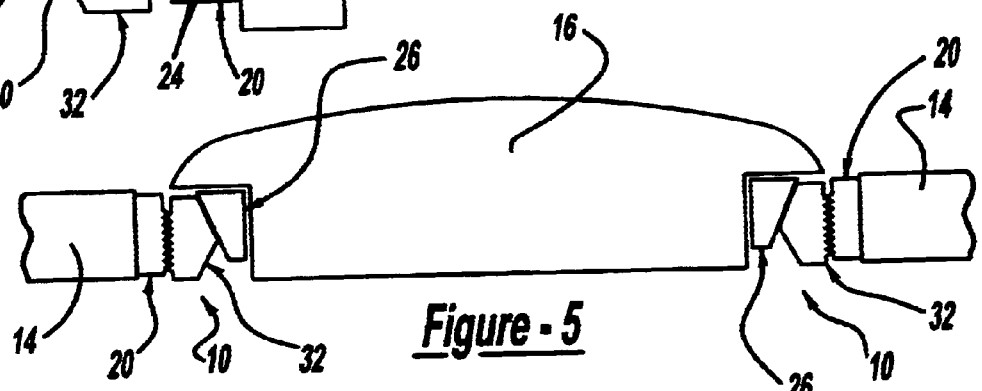
FIG. 5 is a plan view of the wedge system of FIG. 1 illustrating a wide gap between the liftgate and vehicle body.
Figure 6:
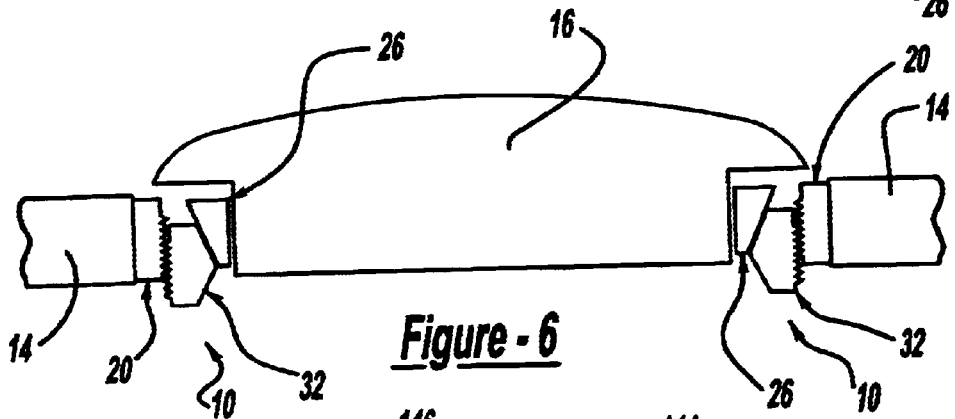
FIG. 6 is a plan view of the wedge system of FIG. 1 illustrating a narrow gap between the liftgate and vehicle body.

In operation, the wedge system 10 has the first member 20 secured to the vehicle body 14 and the second member 26 secured to the liftgate 16 on each transverse or cross-vehicle side of the vehicle 12. Initially, the third member 32 is located at a rearmost position relative to the first member 20 as illustrated in FIG. 3. An assembler or operator (not shown) closes the liftgate 16 such that the liftgate engages a latch (not shown) and the edges of the liftgate 16 are flush with the vehicle body 14. During this process, when the liftgate 16 is moved to a closed position such that the inner panel 27 is adjacent the vehicle body 14, the third member 32 is in full contact with the second member 26 on the liftgate 16 and is moved in an adjustment direction indicated by arrow 42 by ratcheting smoothly on the first member 20 on the vehicle body 14 as illustrated in FIG. 4. The operator would then open the liftgate 16 and secure the third member 32 into the newly adjusted position relative to the vehicle body 14. By this assembly process, the over-compression of the second member 26, causing high closing effort, can be avoided and contact between the liftgate 16 and vehicle body 14 can be determined. It should be appreciated that, before the third member 32 is secured in place, the third member 32 is movable and the teeth 36 of the third member 32 ratchet on the teeth 24 of the first member 20 and that the first tapered outer surface 38 of the third member 32 slides on the tapered outer surface 30 of the second member 26. It should also be appreciated that slope or taper of the tapered outer surface 30 of the second member 26 and the first tapered outer surface 38 of the third member 32 accommodate the gap variation automatically at the same time they are in contact for a wide build as illustrated in FIG. 5 and a narrow build as illustrated in FIG. 6.

Figure 7:
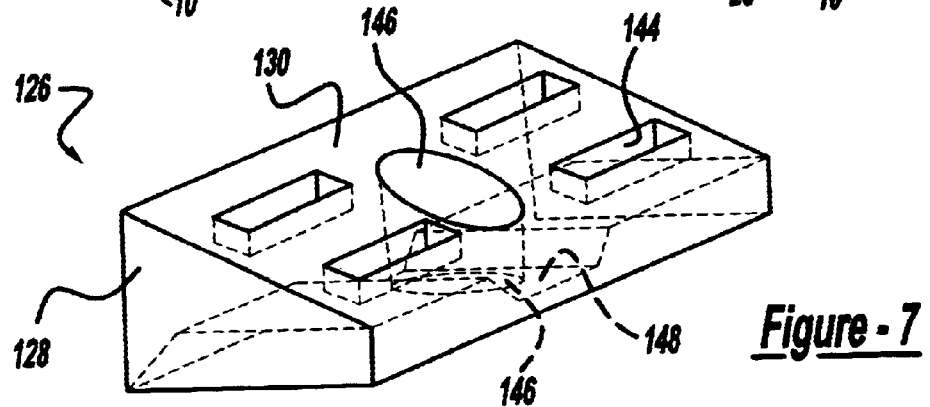
FIG. 7 is a perspective view of another embodiment, according to the present invention, of a second member of the wedge system of FIG. 1.

Referring to FIG. 7, another embodiment, according to the present invention, is shown for the second member 26. Like parts of the second member 26 have like reference numerals increased by one hundred (100). In this embodiment, the second member 126 has the base portion 128 and the tapered outer surface 130 extending outwardly at an angle from the base portion 128. The second member 126 may have at least one, preferably a plurality of recesses 144 in the tapered outer surface 130. The recesses 144 are generally rectangular in shape. The second member 126 may also have a hollowed out portion 146 extending into the base portion 128. The hollowed out portion 146 may form a channel 148 in the base portion 128. It should be appreciated that the second member 126 provides good engagement and cross-car stiffness.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A vehicle comprising:

a vehicle body having an opening;

a movable liftgate attached to said vehicle body to open and close said opening; and an adjustable wedge system disposed between said liftgate and said vehicle body on each lateral side of said opening to accommodate a gap between said liftgate and said vehicle body and to stabilize said liftgate by providing a load path from said liftgate to said vehicle body when said liftgate is in a closed position, said adjustable wedge system comprising a first member mounted to said vehicle body and having at least three first teeth spaced longitudinally therealong and extending toward said liftgate, a second member mounted to said liftgate, and a third member disposed between said first member and said second member and having a plurality of second teeth spaced longitudinally therealong and extending away from said liftgate to ratchet with said first teeth.

2. A vehicle as set forth in claim 1 wherein said second member has a first tapered outer surface.

3. A vehicle as set forth in claim 2 wherein said third member has a second tapered outer surface to mate with said first tapered outer surface.

4. A vehicle as set forth in claim 1 wherein said third member is made of a plastic material.

5. A vehicle comprising:

a vehicle body having an opening;

a movable liftgate attached to said vehicle body to open and close said opening; and an adjustable wedge system disposed between said liftgate and said vehicle body on each lateral side of said opening, said wedge system comprising a first member mounted on said vehicle body and having at least three first teeth spaced longitudinally therealong and extending toward said liftgate, a second member made of a resilient material mounted on said liftgate, and a third member made of a plastic material disposed between said first member and said second member and having a plurality of second teeth spaced longitudinally therealong and extending away from said liftgate to ratchet with said first teeth to be adjustable relative thereto to accommodate a gap between said liftgate and said vehicle body and to stabilize said liftgate by providing a load path from said liftgate to said vehicle body when said liftgate is in a closed position.

* * * * *